April 19, 1966     C. L. PONDER     3,247,360
ELECTRICALLY HEATED NURSING BOTTLES
Filed Jan. 18, 1963

INVENTOR
CHARLES L. PONDER
BY Robert M. Dunning
ATTORNEY

United States Patent Office 3,247,360
Patented Apr. 19, 1966

3,247,360
ELECTRICALLY HEATED NURSING BOTTLES
Charles L. Ponder, 694 Rondo Ave., St. Paul, Minn.
Filed Jan. 18, 1963, Ser. No. 252,442
6 Claims. (Cl. 219—436)

This invention relates to an improvement in milk bottles and deals particularly with a bottle capable of heating milk or other material to a predetermined temperature, and to provide a means of feeding the baby regardless of the position of the milk bottle.

With milk bottles of the usual type, equipped with nipples so that the baby can drink the milk, it is necessary that the bottle be held above the baby as the feeding takes place by gravity. A great number of different types and forms of bottle supports have been produced presumably designed to support the bottle so that the baby may be fed without requiring the constant attendance of the mother. While some of these bottle holding devices may be made to function effectively, they are often more bother to set up and use than holding the bottle during the feeding operation. Furthermore, it is my belief that when the milk is fed by gravity, more than the necessary amount of air is consumed with the milk which causes corresponding distress to the baby. Thus it is an object of the present invention to provide a baby bottle from which milk may be removed even while the bottle is in an upright position.

A feature of the present invention resides in the provision of a baby bottle which includes a tube extending the full length of the bottle on the interior thereof, the tube being preferably provided with a swivel joint and an angular end which normally falls to the lowest part of the interior of the bottle when the bottle is tilted. At the upper end of this tube a novel nipple construction is provided, this construction including an inner nipple and an outer nipple, the outer nipple being sufficiently longer than the inner one to provide a chamber therebetween. When the two nipples are compressed together, a partial vacuum is created between the two nipples, tending to draw liquid upwardly through the tube. A simple check valve is provided at the lower end of the tube to prevent the return of the liquid. As the two nipples are repeatedly compressed and released, the milk is drawn upwardly through the nipples and into the mouth of the baby.

An added feature of the present invention resides in the provision of a nursing bottle having a thermometer enclosed within a cavity in the wall. The bulb of this thermometer is in heat exchange relation to the liquid within the bottle. By this means, the attendant can notice immediately the temperature of the liquid, thereby dispelling any possible doubt as to the proper temperature. The thermometer may also serve other purposes when the bottle is disassembled, such as for noting the temperature of the baby's bath, and other such purposes.

A further feature of the present invention resides in the provision of a milk bottle including a generally cylindrical shell having external screw threads at opposite ends which permit the lower end of the shell to be threaded into a suitable base and the upper end of the shell threaded into a suitable cap supporting the nipples. In preferred form, the base cap includes one or more heating elements and a thermostat for controlling the heating elements. By energizing either of these heating elements, the contents of the bottle may be heated. As will be evident, the structure is useful for many purposes other than its primary purpose, as the body of the bottle, together with its base cap, may be used for a heating receptacle for heating either liquid or solid materials of various types.

A further object of the present invention resides in the provision of a bottle of the type described which includes a base on which the bottom cap may be positioned, and which is provided with a series of angularly arranged sockets which may serve to accommodate prongs projecting downwardly from the bottom bottle cap. These prongs form terminals for the two heating elements incorporated in the base cap. One pair of sockets is electrically connected to an electrical plug on the base which may be connected by a flexible cord to a suitable electrical outlet. The other pair of sockets is electrically connected to a rechargeable nickel-cadmium battery or similar battery element designed to provide current for the other heating element in the base cap. As a result, the milk may either be heated by the battery, or by house current.

An object of the present invention resides in the fact that by providing a battery supply of electricity, the device may serve a multitude of uses. For example, the bottle may even be used as a hot water bottle if desired. The body of the bottle is preferably provided with a pressure relief valve which may open if the interior of the bottle is subjected to abnormal pressures, thereby making the bottle completely safe even though the thermostat may be set to provide relatively high interior temperatures.

These and other objects and novel features of the present invention will be more clearly and fully set forth in the following specification and claims.

In the drawings forming a part of the specification;

Figure 1:
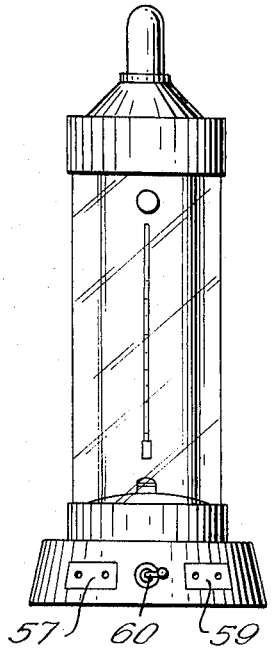
FIGURE 1 is a side elevational view of the bottle in heating position.
Figure 3:
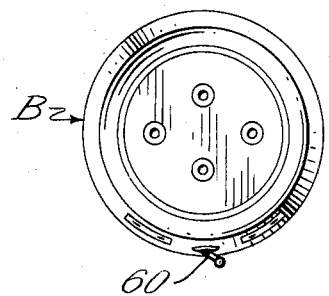
FIGURE 3 is a top plan view of the base of the bottle with the bottle removed therefrom.
Figure 4:
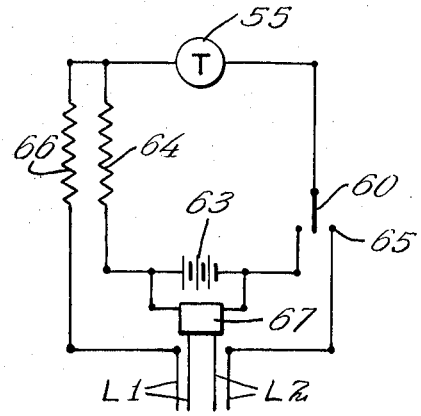
FIGURE 4 is a wiring diagram showing the two current sources.
Figure 2:
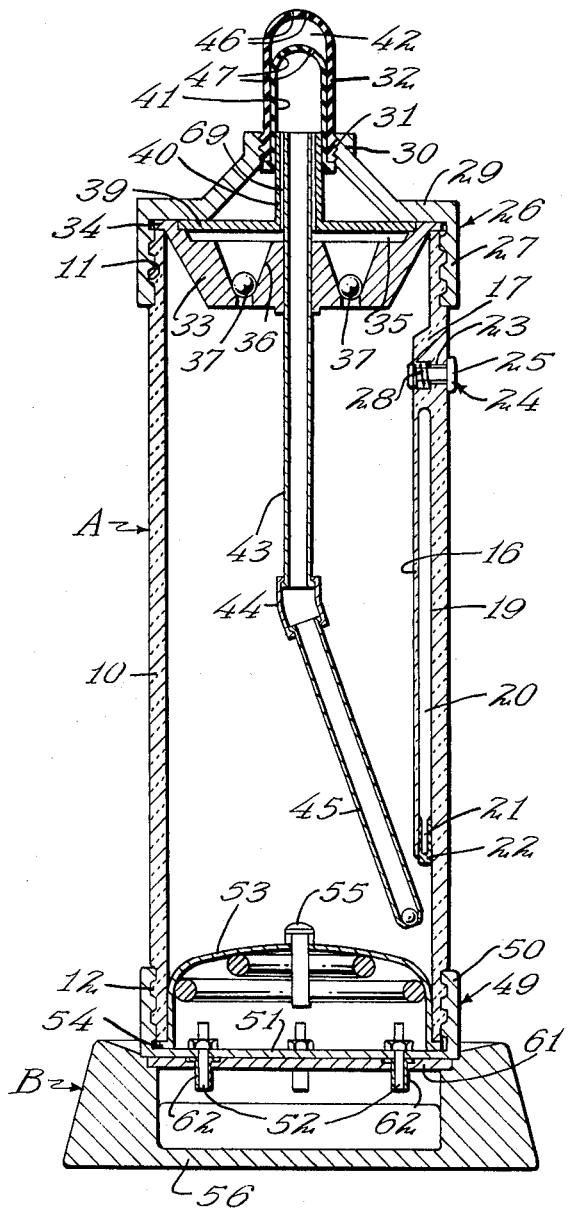
FIGURE 2 is a vertical sectional view through the bottle shown in FIGURE 1.

The bottle is indicated in general by the letter A, and is detachably supported upon the base B. The bottle A includes elongated generally cylindrical shell-like body 10 having external threads 11 and 12 at its upper and lower ends, respectively. An internal rib 16 extends longitudinally of the inner surface of the body 10. This rib 16 has a closed upper end 17 and has a hollow bore 19 extending longitudinally thereof. A thermometer 20 is snugly supported in the bore 19, and the bulb 21 of the thermometer 20 is held in place by a small metal screw or plug 22 which is made of metal or other material highly conductive to heat. A transverse passage 23 extends through the rib 16 in the closed upper end thereof, and accommodates a safety valve 24 having an end 25 normally seated against the outer surface of the body 10 and held in this position by a spring such as 28. The member 24 serves as a safety valve, and if the pressure within the container becomes abnormally high, the safety valve is permitted to open and to permit the escape of steam or air pressure.

The upper end of the body 10 is normally closed by a cap 26 having an internally threaded skirt 27 engageable with the threads 11. The cap 26 includes a top closure plate 29 having an axially internally threaded or grooved boss 30 designed to accommodate the externally threaded lower end 31 of an outer nipple 32. The cap 26 also supports a valve housing 33 having a peripheral flange 34 which is sandwiched between the cap closure plate 29 and the upper end of the sleeve 10. The housing 33 has a recessed upper end 35 and includes a series of tapered apertures 36 arranged in angularly spaced relation about the axis of the generally frusto-conical housing 33. Valve balls 37 are provided in each of the tapered passages 36, and normally are held by gravity near the lower ends of the openings 36 to close the passages. The recessed upper end 35 of the housing 33 is normally closed by a closure plate 39 having an upwardly extending axial hollow sleeve 40 thereupon. This sleeve supports an inner nipple 41 which is of slightly smaller diameter than the nipple 32 and is slidable thereinto. The inner nipple 41 is somewhat shorter than the outer nipple 32 so as to provide a chamber 42 between the two nipples.

An axial tube 43 is supported within the upwardly projecting sleeve 40 and extends downwardly therefrom through the housing 33. A swivel joint 44 connects the lower end of the sleeve 43 with a tube extension 45 which extends downwardly to a point near the periphery of the sleeve 10 and near the lower ends thereof. The swivel joint 44 preferably permits the angular end 45 to swing toward the lowest point of the bottle when the bottle is tilted out of vertical position.

The outer nipple 32 is provided with perhaps two spaced small diameter openings 46 therethrough, while the inner nipple 41 is provided with a greater number of such openings 47. As an example, the inner nipple 41 may be provided with four holes therethrough. As a result, when the two nipples are squeezed, a partial vacuum will be caused between the nipples tending to draw liquid upwardly through the tubes 43, 45.

The lower cap 49 is provided with an internally threaded skirt 50 designed to fit the threads 12 at the lower end of the sleeve 10. The cap 49 includes a bottom closure plate 51 having a series of angularly spaced prongs 52 extending downwardly therefrom. The prongs 52 are formed of electrically conductive material and are connected to heating elements in a manner which will be described in conjunction with the wiring diagram. The bottom cap 49 also supports a dome-shaped member 53 of metal or other heat conductive material, the dome-shaped member 53 having a peripheral flange 54 which is sealed to the bottom closure plate 51 of the cap. A thermostatic element includes an end 55 which is insulated from, and which extends through the center of the dome 53 for measuring the temperature of the liquid within the sleeve. The thermostatic element 55 will also be later described in conjunction with the wiring diagram.

The base B includes a central cavity 56 which accommodates a nickel-cadmium battery or similar power source. The cavity 56 may also include a battery charger capable of recharging the battery when energized by house current. The base B may include a pair of plugs 57 and 59 which may be connected by a flexible cord to a house outlet. The base may also include a switch 60 by means of which the circuits may be controlled.

The cavity 56 is closed at its upper end by a closure plate 61 including a series of angularly spaced sockets 62 into which the prongs 52 may extend. The prongs 52 and sockets 62 merely form a means of separating the bottle from the base when the bottle is in use.

The operation of the apparatus is believed evident from the foregoing description. The switch 60, when in one position, closes a circuit from the battery 63 to a heating element 64, the circuit including the thermostatic element which is designed to open the circuit when a predetermined temperature is attained. The switch 60 may also close a second circuit through the terminal 65, this circuit including line wire L–1, a heating element 66, the thermostat 55, the switch 60, and line wire L–2. A third circuit may be provided through the connecting cord connecting the charger 67 to the battery 63 in order to charge the battery when necessary.

The bottle may be filled to the desired level with milk or other liquid, and may be heated either by using the battery current or the line wires. When the liquid is at the proper temperature, the current will be cut off by the thermostat 55. The temperature of the liquid may be readily noted at any time by observation of the thermometer 20.

When the liquid has been heated to the proper temperature, it may be used either in the conventional manner or while the bottle is upright. When used in the conventional manner, the tilting of the bottle causes the balls 37 to open the apertures 36, permitting the liquid to flow through small openings 69 in the plate 39 about the periphery of the tube 43. The liquid may then be drawn through the two nipples. However, if the bottle is to be used in an upright or slightly tilted position, pressure upon the nipples will cause a partial vacuum to be created between the two nipples, drawing the liquid up through the tubes 43 and 45 and through the openings in the nipples. Thus the bottle may be used in virtually any position to dispense the liquid.

In accordance with the patent statutes, the principles of construction and operation of this improvement in milk bottles have been described, and while an endeavor has been made to set forth the best embodiment thereof, it should be understood that changes may be made within the scope of the following claims without departing from the spirit of the invention.

I claim:

1. A nursing bottle including
   a hollow body having a removable cap at one end thereof,
   a tube connected to said cap and extending into the exterior of said hollow body from said cap to a point adjacent to the other end of said body,
   a check valve in said tube,
   a nipple structure on said cap in communication with said tube,
   said nipple structure including a pair of nipples in telescoping relation and providing a space between the ends of the nipples, and
   each of said nipples having openings therethrough, the outer nipple having a smaller total area of openings than the inner of said nipples.

2. The structure of claim 1 and in which said tube includes an end extending parallel to the axis of the body and an angularly extending end connected to said first named end and extending into close proximity with the inner surface of said body and pivotal about the axis of the first named end of said tube.

3. The structure of claim 1 and including auxiliary passages in said cap communicating with the interior of said nipple structure and with the interior of said hollow body, and gravity operated check valves in said auxiliary passages normally closing said auxiliary passages when said body is upright with said cap uppermost.

4. A nursing bottle including
   an open ended sleeve,
   a pair of caps detachably connected to the ends of said sleeve,
   a tube having one end connected to one of said caps extending into the interior of said sleeve and having a free end adjoining the other of said caps,
   a pair of nipples in telescoping relation on said one cap in communication with said tube,
   said nipples having apertured ends in spaced relation to provide a chamber between the nipple ends, the outer of said nipples having a smaller total area of openings than the inner of said nipples,
   a partition in said sleeve through which said tube extends and adjoining said one cap,
   an auxiliary passage through said partition and communicating with the interior of said nipples and with the interior of the sleeve between the partition and the other end cap,
   a check valve normally closing said tube and operable by the presence of partial vacuum within said nipples to open, and
   a check valve in said auxiliary passage normally closed when said sleeve is upright and open when said sleeve is inverted.

5. The structure of claim 4 and in which the other said cap includes an electrical heating element.

6. The structure of claim 4 and in which the other said cap includes a liner of material of high heat conductivity, and
an electrical heating element in heat transfer relation to said liner.

References Cited by the Examiner
UNITED STATES PATENTS

| | | | |
|---|---|---|---|
| 335,347 | 2/1886 | Forster. | |
| 730,337 | 6/1903 | Bonnefont. | |
| 1,510,363 | 9/1924 | Wangen | 215—11 |
| 1,693,371 | 11/1928 | Deegan | 215—11 |
| 2,277,605 | 3/1942 | Palitzsch | 219—439 |
| 2,357,477 | 9/1944 | Killman | 215—11 |
| 2,438,066 | 3/1948 | Lloyd | 215—11 |
| 2,640,907 | 6/1953 | Morey | 219—433 |
| 2,680,190 | 6/1954 | Schmidt | 219—432 |
| 2,817,744 | 12/1957 | Free | 219—439 |
| 2,984,377 | 5/1961 | Biondi | 128—252 |
| 3,044,650 | 7/1962 | Oltion et al. | 215—11 |
| 3,079,486 | 2/1963 | Winchell | 219—528 |

FOREIGN PATENTS 40,523   4/1916   Sweden.

RICHARD M. WOOD, *Primary Examiner.*
ANTHONY BARTIS, *Examiner.*